Figure 1:
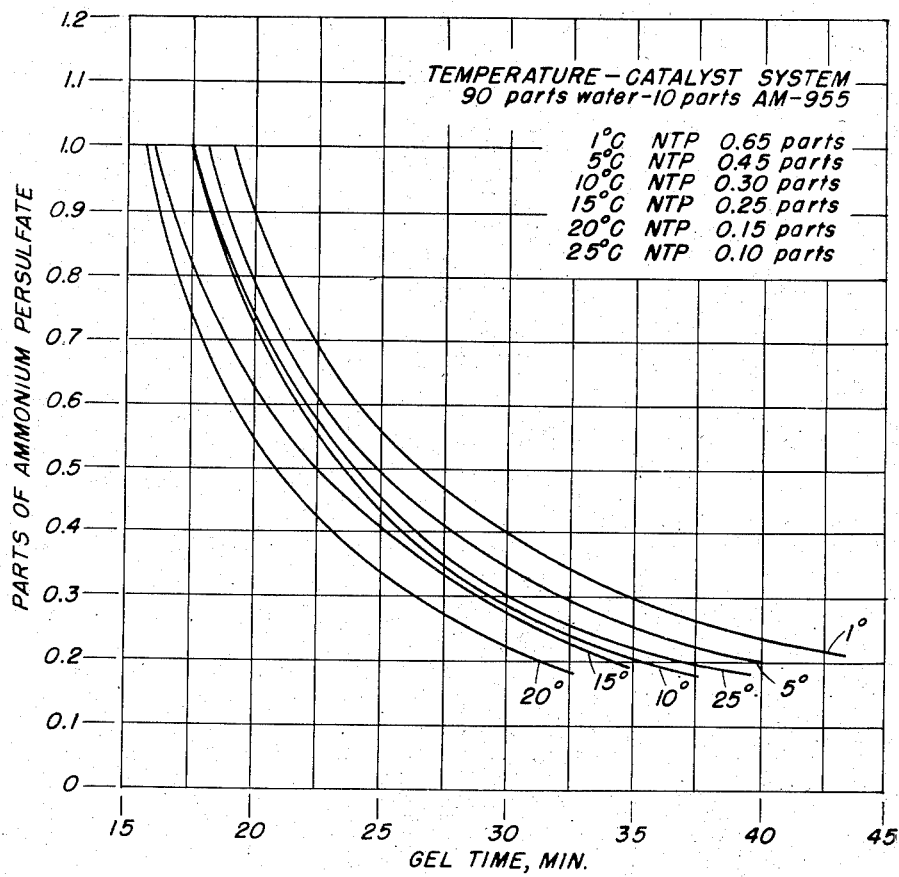

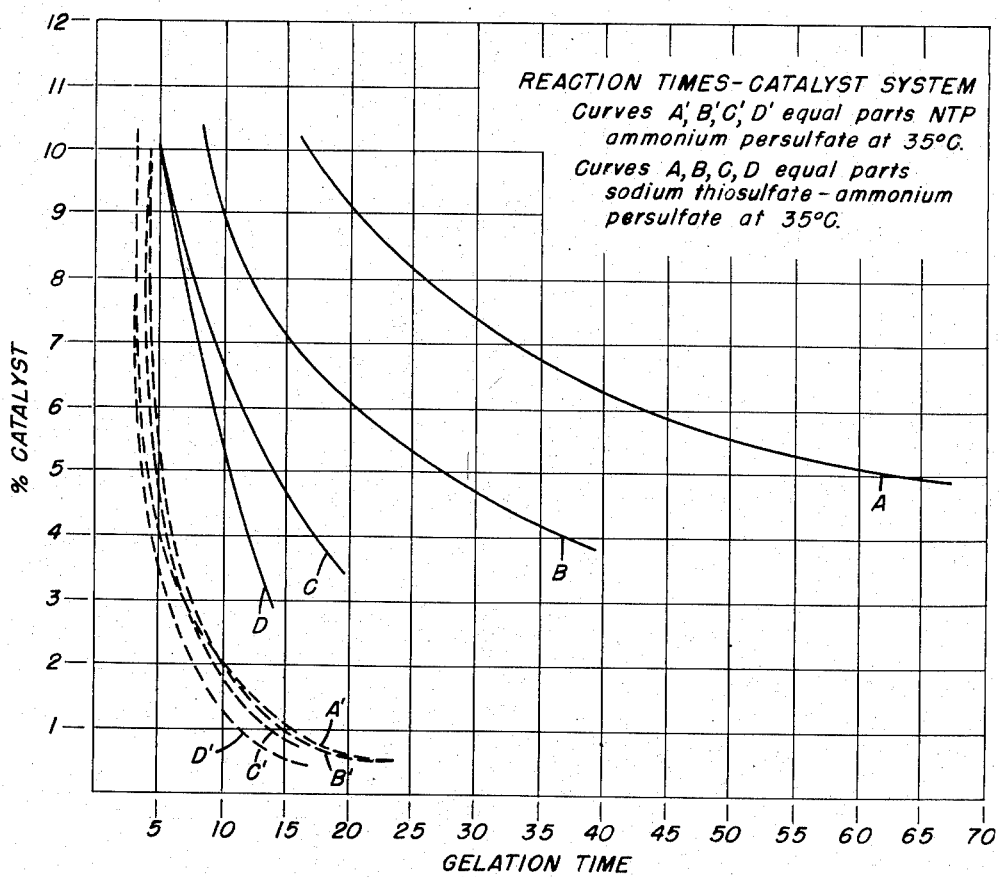

United States Patent Office 2,801,985
Patented Aug. 6, 1957

2,801,985
SOIL STABILIZATION

Roy W. Roth, Stamford, Conn., assignor to American Cyanamid Company, New York, N. Y., a corporation of Maine Application May 18, 1956, Serial No. 585,668

8 Claims. (Cl. 260—41)

The present invention relates to methods for the stabilization of soils with polymeric material and more particularly to a novel process of effecting controlled activation in the polymerization of the polymerizable material in the presence of natural soils. Upon polymerization, the polymer-soil aggregate is stabilized to a condition substantially non-dispersible in water, i. e., the aggregate does not form, even after appropriate agitation, a true or colloidal solution, emulsion, or suspension in water to any significant extent. The convertible compositions of the invention contemplate between about 3 and about 200 parts by weight of soil to 1 part of a water-soluble copolymerizable mixture containing between about 0.005 and 0.2 part of one or more selected alkylidene bisacrylamides and one or more selected ethylenic monomers.

In soil stabilization, the product applied to the soil should preferably be in a form permitting easy application thereof to the soil. For example, it may be a substantially non-viscous liquid that can be pumped into soil as a grout, i. e., a thin slurry or solution which on injection into permeable soils inhibits water permeations; or it may be in a solid pulverent form which may readily be evenly distributed upon, or mixed with, the soil, dissolved and thereafter polymerized in the soil.

The chemical reactions or polymerizations of these materials are generally sensitive to variables, such as pH, the influence of other chemicals that may be present, and the temperature, which must be considered. Ideally, a system or material is desirable which will work effectively in a variety of soils which may vary widely in chemical composition and in pH and which may be employed with a minimum change in formulation.

Soils possess at least two other variables which require study with respect to the employment of stabilizers. Soils vary greatly in permeability, and for example, a grouting solution is of little value if it cannot be easily applied, e. g., injected into a site; sprayed in solution form; or easily blended, usually in dry form, into the soil requiring treatment. Secondly, the use of stabilizer solutions in a form no more viscous than water is helpful, since they can be pumped into any soil through which water can pass.

However, provisions must be made when treating porous soils or gravels to avoid loss of the stabilizer by too rapid permeation before it sets. Thus to avoid loss, control of polymerization in the stabilization or impermeabilization of soil is very desirable, otherwise in various applications, e. g., in grouting dams and levees, foundations, tunnels, mine shafts, and around some excavations where well-pointing stabilization procedure may not be practical.

The treatment involves the incorporation in the soil of a polymerizable monomer which is capable not only of forming a gel by polymerization but of causing the soil particles to enter into the structure during polymerization rather than merely to be mixed with the soil as in the case of an inert filler. The soil-gelled polymeric structure which is formed is a liquid-impermeable and substantially strengthened soil aggregate.

It is accordingly an object of the instant invention to provide a process for the improved stabilization of soils. It is another object of this invention to effect improved stabilization of soils by controlling the polymerization of the polymerizable soil stabilizer employing an oxidation-reduction catalyst system. More particularly, it is the object of the present invention to control the rate of polymerization of soil stabilizer of the type described hereinbefore by utilization of nitrilotrispropionamide as the reducing agent in the catalyst system. Polymerization when using the activator of the invention has been found to be an effective means of fixing the position of gel, securing polymerization in dilute solutions, and counteracting both the inhibiting effect of the soil and of the temperature variations, while maintaining the desired gelation time. Nitrilotrispropionamide gives excellent results even at low temperatures where difficulties with other catalyst systems are most pronounced.

The nitrilotrispropionamide activator, i. e., the reducing component of the catalyst system, may be applied to a solution of the comonomers containing the oxidizing component of the catalyst system hereinafter more fully described; or the activator may be added to the monomer solution and thereafter the oxidizing component may be added; or the activator may be mixed with the monomers as solids, then dissolved and then adding the oxidizing component.

The catalyst system herein provided may be useful as a means of insuring stabilization in grouting operations which are used to seal dams or to waterproof basements where without some means of securing rapid setting, the solution might drain away before it had time to set. It is useful, also, as a means of effecting stabilization from a sprayed or mixed application to canals and airports. In this application, it is possible that the catalyst might be treated before mixing; so that with timing, the wetted front would not penetrate beyond the depth which the solution would fully saturate. To avoid clogging of the spraying device, it is advisable to apply stabilizer and catalyst from separate nozzles.

Stabilizers using small amounts of nitrilotrispropionamide have been found substantially more effective in the whole range of temperatures normally encountered in treating soils, i. e., from below about 25° F. to above about 100° F.

Suitable alkylidene bisacrylamides which may be employed are such as the comonomers described in pending U. S. application Serial No. 524,542, namely those having the formula:

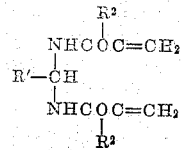

in which

is a hydrocarbon residue of an aldehyde and R² is a member of the group consisting of hydrogen and a methyl radical.

The other comonomer is a solid, liquid or gaseous ethylenic (i. e., contains at least >C=C< radical) compound with a solubility of at least about 2% by weight, and preferably at least about 5%, in water and which copolymerizes with the aforesaid bisacrylamide in an aqueous system. Although not essential in practicing the invention, it is preferred to select an ethylenic comonomer which is preferably soluble or at least self-dispersible in water with appropriate stirring, as such, for example, methylene-bisacrylamide, which is capable of polymerizing.

The successful use of soil stabilizers frequently depends on the control, or ability to control, or accelerate polymerization of the stabilizing material following application theerof to the soil, and this is so particularly when applying chemical stabilizers to large areas and on soil of substantial porosity. Unless the polymerization is closely controlled, polymerization may be effected either prematurely, in which case a skin effect will result, greatly diminishing the advantage, or else too much time elapses, in which case the grout solution will have drained from the soil in the area sought to be stabilized. The ability to control polymerization may be and frequently is critical. It has the advantage of permitting localized and timely polymerization of the polymerizable material at a time when the polymerizable material is in the best physical relationship with the soil, thereby providing the maximum stabilizing effect.

Any soil may be used as a constituent of the present composition including silt, sands, loams, clays, etc., both naturally occurring and those which have been processed by mining, washing, etc., such as bentonite, kaolinite and the like. Soil mixtures are also within the scope of the invention, including such materials as oil well drilling muds. Thus, the term "soil" is used herein in a broad sense and expressions such as "ground" and "earth" are employed to denote the solid surface of the earth and its interior.

Any copolymerizable composition containing an alkylidene bisacrylamide according to the above formula and an ethylenic comonomer of the type described may be employed in practicing the present invention to produce soil masses of decreased water permeability and/or improved load-bearing properties by conversion of the soil composition to a substantially water-insoluble state. This conversion appears to be brought about by an addition or vinyl type polymerization with cross-linking by the bisacrylamide resulting in a three-dimensional structure.

In addition to the comonomer N,N'-methylene bisacrylamide set out in the examples hereinafter, any of the alkylidene bisacrylamides corresponding to the above formula which are described and claimed in Lundberg Patent No. 2,474,846 or mixtures thereof may be used as cross-linking agents. Only slight solubility is required of the alkylidene bisacrylamide in view of the small amount used; therefore, this component may have a water solubility as low as about 0.02% by weight at 20° C. but a solubility of at least about 0.10% is more desirable for general purposes.

A wide variety of ethylenic comonomers or mixtures thereof are copolymerizable with the alkylidene bisacrylamides; those having a formula containing at least one $>C=C<$ group, hereinafter referred to as the ethenoid group, and having appreciable solubility in water are suitable for use in the present invention. The unsubstituted bonds in the ethenoid group may be attached to one or more of many different atoms or radicals including hydrogen, halogens, such as chlorine and bromine, cyano, aryl, aralkyl, alkyl, and alkylene with or without solubilizing groups attached to these hydrocarbons. In addition, the substituents on the ethenoid group may comprise one or more hydrophilic groups including formyl, methylol, polyoxyalkylene residues and quaternary ammonium salt radicals,

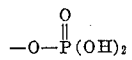

—OOCH, —OOCCH₃; —SO₃X, where X is H, NH₄, an alkali metal or an alkylamine; —CONR₂ and

where each R is hydrogen, alkylol, lower alkyl or a polyoxyalkylene radical; and —COOR' and —CH₂COOR', where R' is a H, NH₄, alkali metal, alkaline earth metal, organic nitrogenous base, alkylol, lower alkyl or polyoxyalkylene radical. The large number of combinations and proportions of the various suitable substituents makes it impractical to list all compounds in this category which may be employed. The water solubility of these substances is known to depend chiefly on the number and type of hydrophilic and hydrophobic radicals therein; for example, the solubility of compounds containing an alkyl radical diminishes as the length of the alkyl chain increases and aryl groups tend to decrease water solubility whereas the aforesaid hydrophilic substituents all tend to improve the solubility of a given compound in water. Accordingly, the comonomer should be selected according to chemical practice from those containing sufficient hydrophilic radicals to balance any hydrophobic groups present in order to obtain the requisite water solubility of monomer.

Among the water-soluble ethenoid monomers, those containing an acrylyl or methacrylyl group are especially recommended. These are exemplified by N-methylol acrylamide, calcium acrylate, methacrylamide and acrylamide. Other suitable ethenoid compounds are acrylic acid; other N-substituted acrylamides, such as N-methyl acrylamide, dimethylamino-propylacrylamide, N-ethylol acrylamide, N-3-hydroxypropylacrylamide; acrylonitrile; saturated alkyl esters of acrylic acid, i. e., methyl acrylate, β-hydroxyethyl acrylate; ethylene glycol and polyethylene glycol acrylates, an example being the reaction product of β-hydroxyethyl acrylate or arcrylic acid with about 1 to about 50 mols or more of ethylene oxide; salts of acrylic acid, i. e., magnesium acrylate, sodium acrylate, ammonium acrylate, zinc acrylate, β-aminoethyl acrylate, β-methyl aminoethyl acrylate, guanidine acrylate and other organic nitrogenous base salts, such as diethylamine acrylate and ethanolamine acrylate; quaternary salts like alkyl acrylamidopropyl dimethylamino chloride; acrolein, β-carboxyacrolein, butenoic acid; α-chloroacrylic acid; β-chloroacrylic acid; as well as methacrylic acid and its corresponding derivatives.

Maleic acid and its corresponding derivatives including partial esters, partial salts, and ester salts thereof; maleamic, chloromaleic, fumaric, itaconic, citraconic, vinyl sulfonic, and vinyl phosphonic acids and their corresponding derivatives and mixtures thereof. Derivatives of this kind and other suitable compounds include α,β-dichloroacrylonitrile, methacrolein, potassium methacrylate, magnesium methacrylate, hydroxyethyl methacrylate, zinc β-chloroacrylate, trimethylamine methacrylate, calcium α-chloromethacrylate, diethyl methylene succinate, methylene succindiamide, monomethyl maleate, maleic diamide, methylene maloanamide, diethyl methylene malonate, methyl isopropenyl ketone, ethyl vinyl ketone, propyl vinyl ketone, vinyl formate, vinyl lactate, vinyl acetate, vinyl bromoacetate, vinyl chloroacetate, vinyl pyrrolidone, allyl levulinate, allyl alcohol, methallyl alcohol, diallyl carbonate, allyl lactate, allyl gluconate, di(β-aminoethyl) maleate, di(methylaminoethyl)maleate, di(N,N-dimethyl β-aminoethyl)maleate, sulfonated styrene, vinyl pyridine, maleic anhydride, sodium maleate, ammonium maleate, calcium maleate, monopotassium maleate, monoammonium maleate, monomagnesium maleate, methyl vinyl ether, N-aminoethyl maleamide, N-aminoethyl maleimide, alkyl aminoalkyl maleamides, N-vinyl amines, N-allyl amines, heterocyclic ethenoid compounds containing nitrogen in a tertiary amino group, and the amine and ammonium are salts of said cyclic compounds, N-vinyl acetamide, N-vinyl-N-methyl formamide, N-vinyl-N-methylacetamide, N-vinyl succinimide, N-vinyl diformamide, N-vinyl diacetamide, vinyl sulfonyl chloride, vinyl sulfonic acid salts, vinyl sulfonic acid amides, vinyl oxazolidone, allyl amine, diallyl amine, vinyl methyl pyridinium chloride, and allyl trimethyl ammonium chloride to name only a few of the operative compounds.

As heretofore indicated, polymerization according to the invention is activated by employing redox catalyst system. As the oxidizing component, any of the usual water-soluble peroxy catalysts, derived from per-acids such as persulfuric, perchloric, perboric and permanganic and their salts may be employed. For example, ammonium, potassium and sodium persulfates, hydrogen peroxide, the alkali metal and ammonium perchlorates, and the like may be employed. As the reducing agent or activator for the catalyst system of the invention, nitrilotrispropionamide is employed. Examples of typical combinations are nitrilotrispropionamide-ammonium persulfate, nitrilotrispropionamide-potassium persulfate and nitrilotrispropionamide-sodium persulfate systems. A mixture of the two catalyst components in a redox system in quantities corresponding to their oxidation-reduction equivalents is not a requirement but may be desirable for some purposes.

Important advantages in using nitrilotrispropionamide as activator are the excellent control of polymerization initiation and the fact that substantially lesser amounts of this catalyst are needed than in catalysts heretofore employed. In general a minimum of about 0.1% catalyst based on the weight of polymerizable monomers is desirable in order to obtain the substantially instantaneous polymerization, although amounts of as little as 0.01% and up to 10% may be employed. Preferably amounts of from about 0.5% to about 7% based on the weight of the monomers are employed. With acrylamide and methylene bisacrylamide as the comonomers, it has been found desirable to use about 0.25% to 5% by weight, based on the weight of the monomers, of nitrilotrispropionamide. It is generally advisable to employ non-metallic equipment or equipment having non-metallic coatings or linings to prevent the possibility of clogging, or otherwise obstruction of the operation. While this invention is not bound to any particular theory, it is believed that the solution of polymerizable monomers penetrates into substantially all pores of the soil particles and the exterior voids between the particles and sets to a three-dimensional copolymer. Such copolymers in the soil are equally impermeable to water, crude petroleum, and other substantially inert liquids; and by stabilizing the lining of pits, quarries, and other earth recesses, these may be employed for storage of such liquids.

The ratio of polymerizable material, which generally comprises from about 0.5% to about 20% alkylidene diacrylamide, and preferably about 3 to 10% based on total polymerizable material, to the amount of soil may be varied widely, but generally the ratio of soil to polymerizable material should be within the range of about 3 to about 200 parts by weight of soil to 1 part by weight of polymerizable material. The preferred range is between about 20 and about 100 parts of soil per part of polymerizable material. Ordinarily, the polymerizable material is dissolved in water to form a solution which is mixed with the soil. The concentration of the solution and the quantity used may be regulated so that the concentration of water in the final mixture of soil and stabilizing components varies anywhere between about 5% and about 50% by weight; depending primarily on the type of soil. Sand, for example, requires much less water than do certain of the clays. The proportions of water used determines to some extent the properties of the resulting stabilized soil. It appears that the optimum conditions for polymerization are realized with at least sufficient water present to saturate the soil, that is, to fill all voids between soil particles and pores therein with the solution of mixed monomers, at the desired degree of compaction when polymerization occurs. The invention, however, is not limited to saturated soil compositions, as substantial advantages are obtained with only partly saturated soil masses.

Compaction or densification of the soil composition helps decrease the water permeability of the resulting product and has an even greater effect in enhancing the strength and load-bearing qualities of the resulting material. These effects may be due entirely or in part to the elimination of voids or air pockets from the soil mass.

The polymerizable material may be incorporated with the soil in any desired manner, as for example, by picking up the soil and intermixing with the stabilizer in a revolving drum. A satisfactory method, for example, comprises premixing the soil and monomer and adding to the mixture a solution of the catalyst in water. Another method of application which may sometimes be employed is spraying an aqueous solution or dispersion of the polymerizable material onto the ground which it is desired to toughen and which contains the catalyst. With this method, plowing of the soil may be beneficial. Yet another method comprises laying a catalyst containing strata at a predetermined depth below the surface so that the catalysis polymerization is effected as the polymerizable material penetrates to this depth. Plowing or loosening of the soil texture may conveniently be done with the "roto tiller" type of plow having revolving tynes which continuously picks up a quantity of soil. This type of plow may be arranged so as to thoroughly blend the soil with the polymerizable material and return the blended soil to its place. For the reason given earlier, the treated soil may preferably be compacted or densified by pressing, tamping, or rolling with a weighted roller prior to polymerization.

Still another method of application which may be employed involves injecting an aqueous solution of the mixed monomers together with a catalyst directly into the ground at the site that is to be stabilized or rendered impermeable to water. For example, an earthen dam may be treated by simply driving perforate injection nozzles or pipes into the side or top of the dam at appropriately spaced intervals without excavating any earth; then an aqueous mixture of the alkylidene diacrylamide and the ethenoid comonomer is pumped into the ground under sufficient pressure to force the mixture out into the soil for a considerable distance from the injection pipe and at the appropriate time polymerized in situ.

The soil stabilizer of the invention may be employed in various other functions, such as strengthening existing highway and railway road beds against erosion or washouts. It is also possible to inject two or three solutions in any order; for example, first a solution containing the catalyst and then the other one or two solutions containing the polymerizable monomers together or separately in such a way that they mix for the first time at the desired location in the ground to be stabilized or impermeabilized. However, there is a possibility that an impermeable membrane or zone may be formed in certain instances unless the catalyst concentration and other polymerization conditions are selected or adjusted to provide a suitable induction period. Such an impermeable membrane or zone, of course, is undesirable, as it tends to prevent complete diffusion or mixing of the constituents of the soil composition.

The compositions disclosed herein may be copolymerized at any temperature ranging from their freezing point up to the point at which any of the constituents decompose. When deep subterranean injections are made as in treating oil wells, etc., control of the polymerization time, as described hereinabove, may be especially important because of the higher temperatures encountered in the well.

The present invention is useful for sealing porous formations along channels in the earth; for example, in plugging or blocking porous formations in an oil well through which a drilling mud is being expended as lost circulation. This treatment may be practiced in either of two ways. The polymerizable mixture of monomers and the catalyst may be mixed with available soil or spent drilling mud for economy and pumped through the interior of the drill pipe for an appropriate interval; or if voids in the porous formation surrounding the bore are not too large, an aqueous dispersion or solution of the monomeric mixture and the catalyst alone may be pumped through the drill pipe into the porous earth to be sealed. The latter case is analogous to the injection methods described above, whereby two copolymerizable components of the three-component compositions are injected into a fixed body of soil, the third component.

The compositions described herein are also useful in the cementing of liners or casings in channels in the earth; for example, in cementing an oil well casing in place after it has been lowered into the well. This may be accomplished by pumping a slurry of soil, e. g., spent drilling mud, water, monomer mixture and catalyst, down the interior of the casing and into the space between the exterior of the casing and the sides of the well. To insure against premature polymerization while the slurry is being put into place in a deep well, it is contemplated that the catalyst may be omitted from the slurry and later introduced as an aqueous solution at the bottom of the well to initiate polymerization as it penetrates upwards through the soil mass, or by introducing the catalyst only at the bottom. In the application of sealing porous formation, the compositions of the invention provide particularly advantageous use in sealing quarries or other large earth excavations to be employed as substitutes for expensive storage tanks for the storage of liquids, for example, crude petroleum.

This invention has wide utility for any purpose in which it is desired to stabilize soil that is to cohere and strengthen soil masses, to impart high viscosity, solid or rubber-like properties, to minimize or substantially eliminate the permeability of soil to water and other substantially inert liquids, and to increase the soil's resistance to erosion by moving liquids. The compositions described herein may also be used as linings for reservoirs, irrigation ditches, adobe buildings, solid and hollow structural shapes, such as soil bricks, blocks, and pipes which do not require firing or baking for adequate strength. Stabilized soil masses suitable for supporting sizeable loads are usually rigid when dry and upon rewetting often become somewhat flexible or rubbery but do not disintegrate or weaken substantially. In preventing cave-ins and slides and reducing the amount of earth to be removed in excavating operations, the injection method is the simplest manner of forming the soil compositions and a relatively light treatment at the periphery only of the excavation is recommended in order to avoid hardening the ground to the stage where digging becomes difficult, especially in the center of the excavation where stabilization serves no purpose. An outstanding advantage of the present invention is that soil, the major component of the composition, is available at the site and only the components of minor weight need be transported.

It is important to keep in mind that the soil stabilizers discussed are effective on soils in relatively low concentrations; hence, the economic justifiability for the large-scale application of these additives is based not on the cost of the chemical alone but rather on the cost per unit of soil treated. It will be apparent that unless the polymerization of a polymerizable comonomer substance is accurately controlled, what may be estimated as an economically feasible treatment became impractical. For example, a solution containing less than about 15% stabilizer costing in excess of one dollar a pound in its dry form if efficiently employed and timely polymerized, after application on the soil may be economical but if the solution is permitted to drain through the soil to be treated by a large excess with a proportionate increase in cost may be required to provide the desired effect; or with certain soils with rapid drainage, it may be impossible to achieve satisfactory stabilization. It is thus evident that control of polymerization may critically affect the feasibility of soil treatment.

In order to insure sufficient strengthening of any given section of group for the support of heavy weight, a surface of from about 1½ inches to about 18 inches of soil treated according to the process of the present invention should be provided. The actual depth necessary will, of course, vary depending upon how fluid the soil is to begin with or, in other words, how much solidifying is required.

In order that the present invention may be more fully understood, the following examples are set forth for purposes of illustration only and any specific enumeration of details should not be interpreted as a limitation, except as expressed in the appended claims.

*Example 1*

To 90 parts of water at 1° C. is added 10 parts of soil stabilizer AM–955,[1] followed by 0.65 part of nitrilotrispropionamide (NTP), and 0.9 part of ammonium persulfate. The solution forms a rigid gel in 20 minutes. No change in gelation time is apparent when the solution is solidified in the presence of soil. The gel-soil aggregate forms a stable structure impermeable to liquids and of good strength.

*Example 2*

To 90 parts of water at 25° C. is added 10 parts of soil stabilizer AM–955, followed by 0.10 part of nitrilotrispropionamide (NTP), and 0.74 part of ammonium persulfate. The solution forms a rigid gel in 20 minutes. The formation of this gel in the presence of soil forms a stabilized liquid impermeable soil of improved strength.

*Example 3*

To 90 parts of water at 25° C. is added 10 parts of soil stabilizer AM–955, followed by 0.10 part of NTP and 0.86 part of potassium persulfate. The solution formed a rigid gel in 20 minutes. The soil-gel structure forms an aggregate of improved strength and is impermeable to liquids.

*Example 4*

To 90 parts of water at 35° C. is added 10 parts of soil stabilizer AM–955, followed by 0.5 part of NTP and 0.5 part of ammonium persulfate. The solution forms a rigid gel in one minute. The gelation time is not altered when the solution is polymerized in the presence of soil, the gel-soil aggregate is liquid impermeable and has good strength.

*Example 5*

To 93 parts of water at 55° C. is added 7 parts of soil stabilizer AM–955, the solution is mixed with soil, followed by addition of 0.10 part NTP and 0.40 part ammonium persulfate. The mixture forms a liquid impermeable stabilized soil of improved strength within 2 minutes.

*Example 6*

To 100 parts of soil stabilizer AM–955 is added 0.25 part of NTP and the solid materials are well mixed. To 10 parts of this mixture, dissolved in 90 parts of water is added 1 part of ammonium persulfate. The solution forms a rigid gel in 21 minutes. The gel-soil structure forms an aggregate of improved strength and is impermeable to liquids.

The results of additional examples are illustrated in the curve of Figure 1. At a given temperature, a specified amount of NTP is added to a solution containing 90 parts of water and 10 parts of stabilizer AM–955. By varying the amount of ammonium pursulfate which is then added to the solution, the time of gelation can be controlled within desired time limits.

*Example 7*

The procedure of Example 1 is repeated with the exception that instead of stabilizer AM–955, equal amounts of a polymerizable mixture comprising about 90% acrylamide and 10% N,N'-methylenebisacrylamide is em-

---

[1] Polymerizable mixture comprising about 95% acrylamide and 5% N,N'-methylenebisacrylamide.

ployed. The gel-soil structure was comparably good in liquid impermeability and strength.

*Example 8*

The procedure of Example 5 was repeated with the exception that instead of AM-955 equal amounts of a polymerizable mixture comprising 99% acrylamide and 1% N,N'-methylenebisacrylamide is employed. The liquid impermeable soil-gel aggregate had comparably good strength properties.

*Example 9.—(Comparative example)*

Sodium thiosulfate-ammonium persulfate (catalyst A) nitrilotrispropionamide-ammonium persulfate catalyst system (catalyst B).

To 90 parts of water at 25° C. is added 10 parts of soil stabilizer AM-955, followed by 1 part catalyst A. The solution gelled in 20 minutes. A similar solution, i. e., 90 parts of water at 25° C. containing 10 parts of soil stabilizer AM-955, is treated with 0.1 part catalyst B containing nitrilotrispropionamide. A rigid gel forms in less than 20 minutes. Hence, by using only one-tenth of the amount of the catalyst system containing nitrilotrispropionamide, the soil stabilizer gels in even less time than required with 10 times the amount of a former redox catalyst.

Further illustration of the unusual activation and control which may be effected by the use of nitrilotrispropionamide may be obtained by referring to Figure 2 where the comparative effects of catalyst system containing NTP (curves A', B', C', D') as against systems in which NTP is not used (curves A, B, C, D) are illustrated.

It will be apparent that numerous variations may be made without departing from the scope of the instant invention, and any enumeration of specific details is not intended to limit the invention except as defined in the appended claims.

I claim:

1. A process for treating soil which comprises applying to soil a copolymerizable mixture comprising (a) a monomeric alkylidene bisacrylamide of the formula

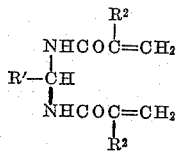

in which

is a hydrocarbon residue of an aldehyde and $R^2$ is of the group consisting of hydrogen and methyl, and (b) another ethylenic monomer copolymerizable with (a) the relative weight of (a) to (b) being within the range of from about 0.005:1 to about 0.2:1, respectively, and the weight ratio of said copolymerizable mixture to soil being from about 1:3 to about 1:200 parts, and converting said soil and polymerizable mixture to a substantially water-insoluble state by a copolymerizable reaction in the presence of a two component redox catalyst system comprising from about 0.1% to about 10%, based on the weight of the copolymerizable material, of nitrilotrispropionamide as an essential component and an oxidizing agent as the second component.

2. A process according to claim 1 in which the alkylidenebisacrylamide comprises N,N'-methylenebisacrylamide.

3. A process according to claim 1 in which the oxidizing component of the redox catalyst system is selected from the group consisting of peracids and their salts thereof.

4. A process for treating soil which comprises applying to soil a copolymerizable mixture comprising (a) N,N'-methylenebisacrylamide and (b) acrylamide, the relative weight of (a) to (b) being within the range of from about 0.005:1 to about 0.3:1, respectively, and the weight ratio of said copolymerizable mixture to soil being from about 1:3 to about 1:200 parts, and converting said soil and polymerizable mixture to a substantially water-insoluble state by a copolymerizable reaction in the presence of a two component redox catalyst system comprising from about 0.1% to about 10%, based on the weight of the copolymerizable material, of nitrilotrispropionamide as an essential component and an oxidizing agent as the second component.

5. The process of claim 4 wherein (b) is methylol acrylamide.

6. The process according to claim 1 wherein the catalyst system comprises nitrilotrispropionamide and ammonium persulfate.

7. The process according to claim 4 wherein the oxidizing component of the redox catalyst system is selected from the group consisting of peracids and the salts thereof.

8. A process for treating soil which comprises applying to soil a copolymerizable mixture comprising (a) N,N'-methylenebisacrylamide and (b) acrylamide, the relative weight of (a) to (b) being within the range of from about 0.005:1 to about 0.3:1, respectively, and the weight ratio of said copolymerizable mixture to soil being from about 1:3 to about 1:200 parts, and converting said soil and polymerizable mixture to a substantially water-insoluble state by a copolymerizable reaction in the presence of a redox catalyst system comprising from about 0.1% to about 10%, based on the weight of the copolymerizable material, of nitrilotrispropionamide and ammonium persulfate.

No references cited.